United States Patent
Barkataki et al.

(10) Patent No.: US 6,332,210 B1
(45) Date of Patent: Dec. 18, 2001

(54) METHOD OF CREATING AND USING SYSTEM-INDEPENDENT SOFTWARE COMPONENTS

(75) Inventors: Shan Barkataki, West Hills; Patricia J. Dousette, North Hills; Dale F. Frederick, Northridge; Stuart H. Harte, Westlake Village; Gary R. Johnson, Newbury Park, all of CA (US)

(73) Assignee: Litton Systems, Inc., Agoura Hills, CA (US)

( * ) Notice: Subject to any disclaimer, the term of this patent is extended or adjusted under 35 U.S.C. 154(b) by 0 days.

(21) Appl. No.: 09/219,571

(22) Filed: Dec. 22, 1998

(51) Int. Cl.$^7$ ........................................... G06F 9/45
(52) U.S. Cl. .................................... 717/1; 717/4
(58) Field of Search ........................... 395/701, 702, 395/703, 704, 671; 364/468.01; 707/103; 717/1, 2, 3, 4; 709/101; 700/95

(56) References Cited

U.S. PATENT DOCUMENTS

| | | | |
|---|---|---|---|
| 5,724,589 | * 3/1998 | Wold .................................. | 717/1 |
| 5,872,971 | * 2/1999 | Knapman et al. ................... | 709/101 |
| 5,936,860 | * 8/1999 | Arnold et al. ....................... | 700/95 |
| 6,016,495 | * 1/2000 | McKeehan et al. ................. | 707/103 |

OTHER PUBLICATIONS

Rumbaugh et al., Object–oriented Modeling and Design, Prentice–Hall, Inc., Nov. 1990.*
Jacobson, Object–oriented Development in an Industrial Environment, OOPSLA 87 Proceedings, Oct. 1987.*
Eriksson–Penker, UML Toolkit, Chapter 6, Advanced Dynamic Modeling: Real–Time Systems, Wiley, Oct. 1997.*
Booch–Rumbaugh–Jacobson, The Unified Modeling Language User Guide, Chapter 16, Use Cases, Addison–Wesley, Oct. 1998.*
Batory–O'Malley, The Design and Implementation of Hierarchical Software Systems with Reusable Components, ACM Transactions on Software Engineering and Methodology, vol. 1, No. 4, pp. 355–398, Nov. 1990.*
Hatley et al., Strategies for Real–Time System Specification, Chapter 5, pp. 59–73 (1988).
Jacobson et al., Object–Oriented Software Engineering, pp. 113–143, (1992).
Rational Software et al., Unified Modeling Language, UML Summary, Version 1.1, pp. 1–19, Sep. 1, 1997.
Rumbaugh et al., Object–Oriented Modeling and Design, Chapter 5, pp. 86–87, Chapter 11, pp. 260–265, (1991).
Ward et al., Structured Development for Real–Time Systems, vol. 2, pp. 41–70, (1985).

* cited by examiner

*Primary Examiner*—Mark R. Powell
*Assistant Examiner*—Hoang-Vu Antony Nguyen-Ba
(74) *Attorney, Agent, or Firm*—Koppel & Jacobs (57) ABSTRACT

A software application is analyzed to identify its "core functionalities", and object-oriented core objects containing no application-specific control behavior are created to perform these essential functions. The event traces in which the core objects participate are identified, and this control behavior is embodied in one or more "control objects", which invoke the operation of various core objects as needed to execute a particular event trace. Because the core functionalities and control behaviors are separated, the core objects are application-independent, and can be re-used in other applications without modification by modifying their associated control objects to different application-specific event traces. The control object can be a higher level "segment controller", controlling the program flow among a group of core objects which perform a particular function, or a "core object controller" which serves the same function for a group of lower-level objects which make up a core object. Core object reusability is further enhanced by using "view managers", i.e., one or more objects which serve as a communication interface between "server" core objects and their "client" objects, making server objects independent of their client objects and thereby enhancing their reusability.

24 Claims, 7 Drawing Sheets

METHOD OF CREATING AND USING SYSTEM-INDEPENDENT SOFTWARE COMPONENTS

BACKGROUND OF THE INVENTION

1. Field of the Invention

This invention relates to the field of computer software, and particularly to methods of creating software components that can be used in different systems with minimal modification.

2. Description of the Related Art

Creating and debugging software code has been and continues to be a very labor-intensive and expensive process. As a result, efforts have been made on many fronts to create "re-usable" code; i.e., code that can function as designed—without modification—in a variety of systems, thereby minimizing the amount of new code that must be created for a given system. As used herein, a "system" refers to software designed for a particular application.

"Object-oriented programming" (OOP) is one technique that facilitates the re-usability of software code. OOP produces application programs that are very modular, and the resulting modules of code can presumably be plugged into other applications. This presumption generally proves to be true for lower level objects, such as an abstract data structure. However, OOP techniques do not necessarily lead to good re-usability for higher level objects. For example, an "aircraft track" object that maintains the speed and altitude of an aircraft may be difficult to re-use, because the actions taken as a result of the data received by the object are dependent on the specific system in which it is employed. The object might be found, for example, in a civilian air traffic control system or a military command and control system, with different reactions required for the same input data. These responsive actions are system-specific and are typically embedded in the object, making them unsuitable for use in a different system.

Figure 1A:
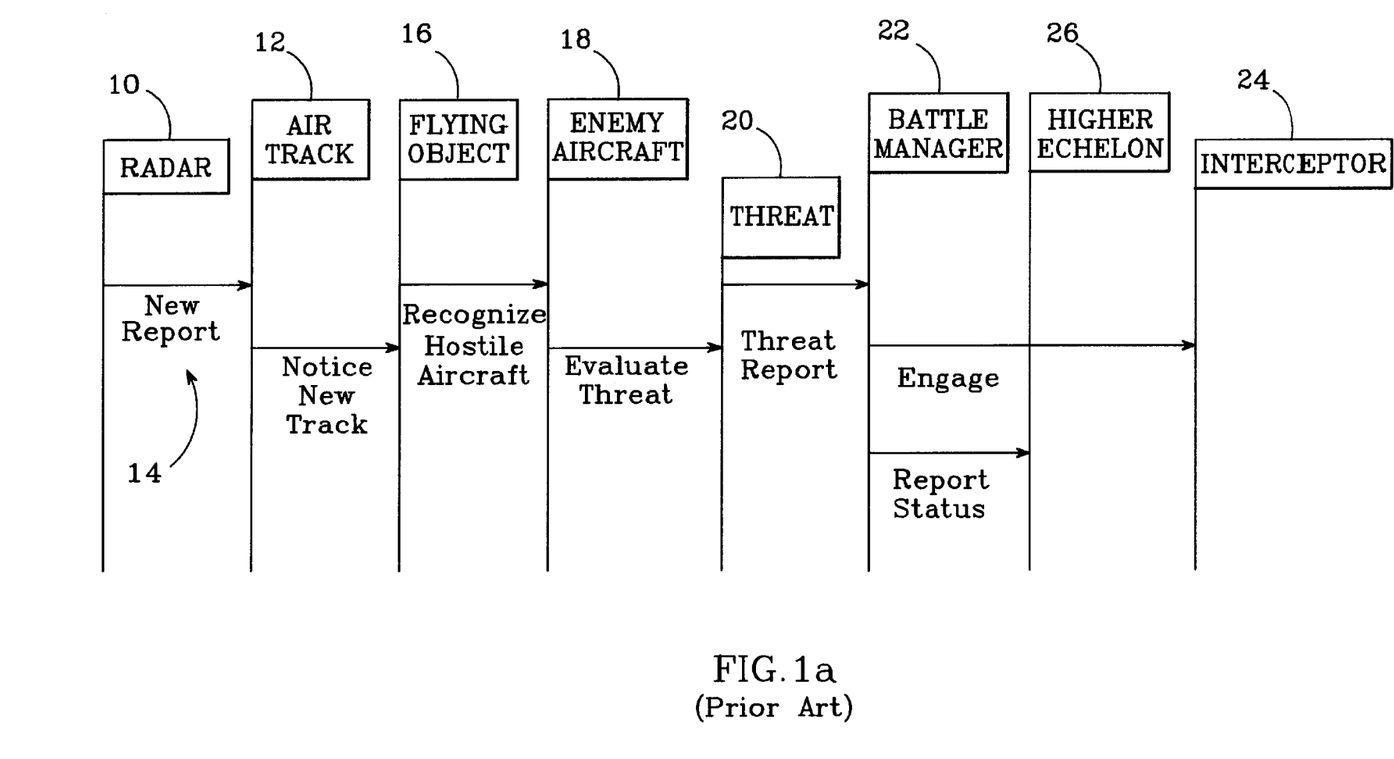
FIG. 1a is a prior art system event trace diagram for a particular software system.

An illustration of this problem using a fictitious air defense system is shown in FIG. 1a, which is an "event trace diagram" for such a system. This system is implemented using OOP techniques, with the objects involved in the handling of a new radar report, such as "Radar", "Air Track", "Flying Object", etc. shown across the top of the diagram. "Events", which cause the control of the program to be passed from one object to another, are shown below the objects.

A typical system event trace starts with a "Radar" object 10 receiving a new report, which it relays to the "Air Track" object 12; i.e., the "event" 14 of "Radar" receiving a new report is the stimulus that causes program control to be transferred to "Air Track". "Air Track" 12 sends control to the "Flying Object" object 16, which recognizes the track as a potentially hostile aircraft and transfers control to the "Enemy Aircraft" object 18. "Enemy Aircraft" evaluates the threat, and transfers control to the "Threat" object 20 as a result. "Threat" creates a report, and the report and program control are sent to the "Battle Manager" object 22. "Battle Manager" interacts with other objects, with control ultimately transferred to an "Interceptor" object 24. The "Battle Manager" object also reports status to a "Higher Echelon" object 26.

Figure 1B:
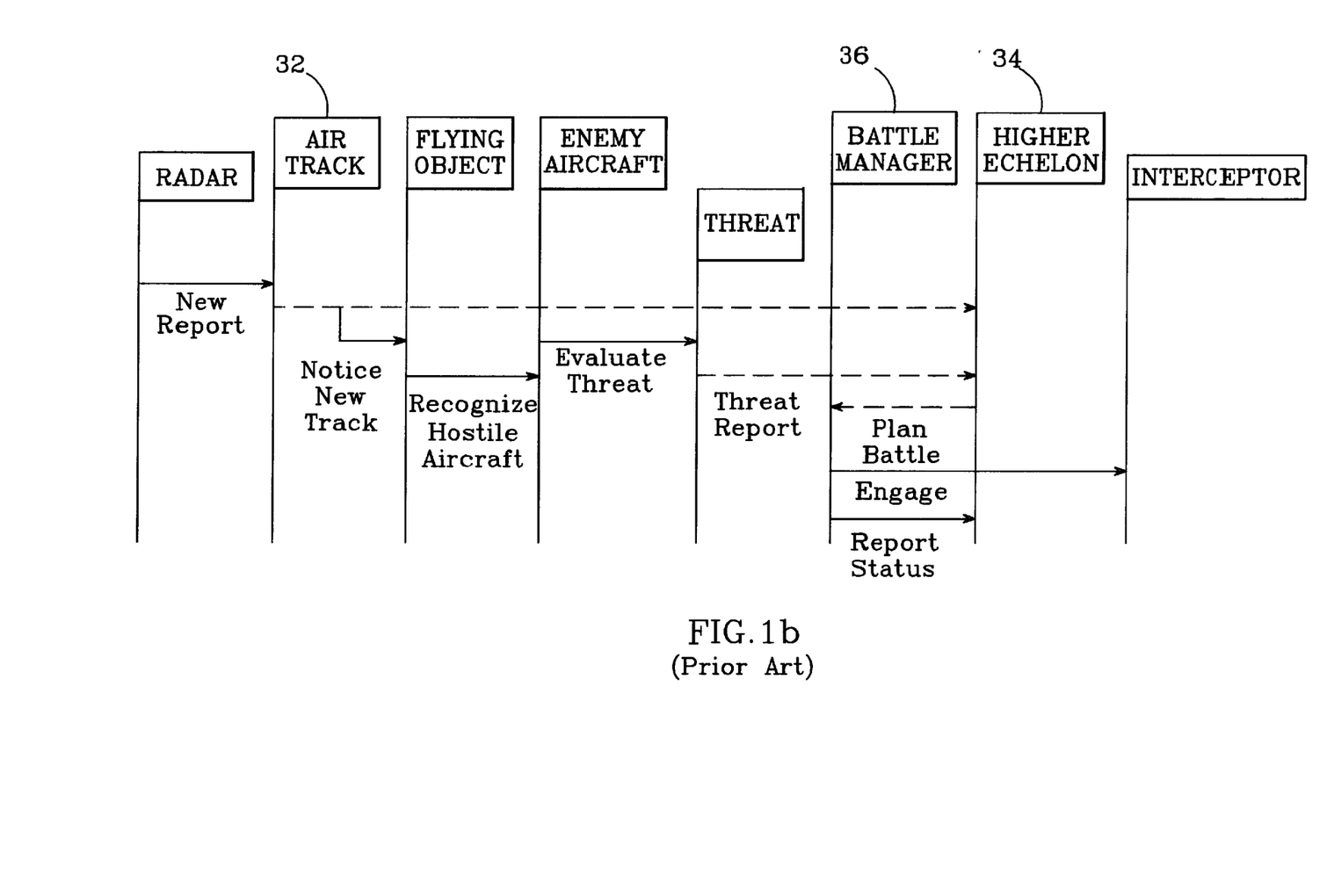
FIG. 1b is a prior art system event trace diagram which includes objects similar to those of FIG. 1a, but for a different software system.

Using conventional OOP techniques, the control sequences needed to execute the event trace in FIG. 1a are built directly into the objects, i.e., "Radar" will call "Air Track", which will call "Flying Object", and so on. However, by so doing, the re-usability of these objects is compromised, because in a different system, the event trace for dealing with a new radar report may be quite different. This is illustrated in FIG. 1b. This different air defense system requires objects having functions similar to those in the FIG. 1a system, but the event traces are different. Here, the "Air Track" object 32 sends track reports directly to the "Higher Echelon" object 34, and the "Battle Manager" object 36 is invoked by the "Higher Echelon" object. To re-use the original "Air Track" or "Battle Manager" objects (12, 22) in the new system, the control sequences encoded within those objects must be replaced with new ones that will implement the new event traces. Thus, these objects are "re-usable" only after modification, with the modification process repeated each time the object is to be re-used in a new system.

Efforts have been made to isolate the program control tasks from a system's functions. For example, Hatley and Pirbhai, *Strategies for Real-Time System Specification,* Dorset House Publishing (1988), pp. 59–72, and Ward and Mellor, *Structured Development for Real-Time Systems,* Yourdon Press (1985), pp. 41–70, discuss the concept of a "controller" that handles program control. However, both of these describe systems designed using functional approaches using structured analysis and structured design, which results in a system architecture that is organized by the specific functions the system has to provide. Unfortunately, the software components created using these approaches remain closely tied to the specific application systems for which they were originally designed, making them difficult to re-use in other systems.

SUMMARY OF THE INVENTION

A method of creating and using system-independent software components is presented, with the resulting code being re-usable in a variety of systems with little to no modification The novel process is used to develop OOP-based systems. A high level of re-usability is achieved by using a design scheme that results in three types of software components: "core" objects, "view manager" objects, and "controller" objects. The core objects embody the essential behavior required by an application, i.e., its core functionalities, and the controller objects represent the control behavior of the underlying system. Separating the core functionalities from the control behavior enables the resulting system-independent core objects to be re-used in different systems.

The view manager objects are used to allow a "server" core object communicate with multiple "client" core objects without creating permanent communication links between the server object and the client objects. The view manager objects also enable a server object to automatically notify all of its client objects whenever there is a state change within the server object. The use of view manager objects further enhances the re-usability of core objects.

Once separated, a system's control behavior is embodied in one or more "control objects", which invoke the operation of various core objects as needed to execute a particular event trace. Because the control objects handle the program flow, the core objects can be re-used in other applications—with little to no modification—by merely modifying the associated control object to accommodate the system-specific event traces.

The inventive concept can be scaled up or down. Thus, a control object can be a "segment controller", controlling the program flow among a group of core objects identified as a "segment" and which perform a higher-level system function, or a "core object controller" which serves the same purpose for a group of lower-level objects which, in combination, make up a core object.

Further features and advantages of the invention will be apparent to those skilled in the art from the following detailed description, taken together with the accompanying drawings.

DETAILED DESCRIPTION OF THE INVENTION

Figure 2:
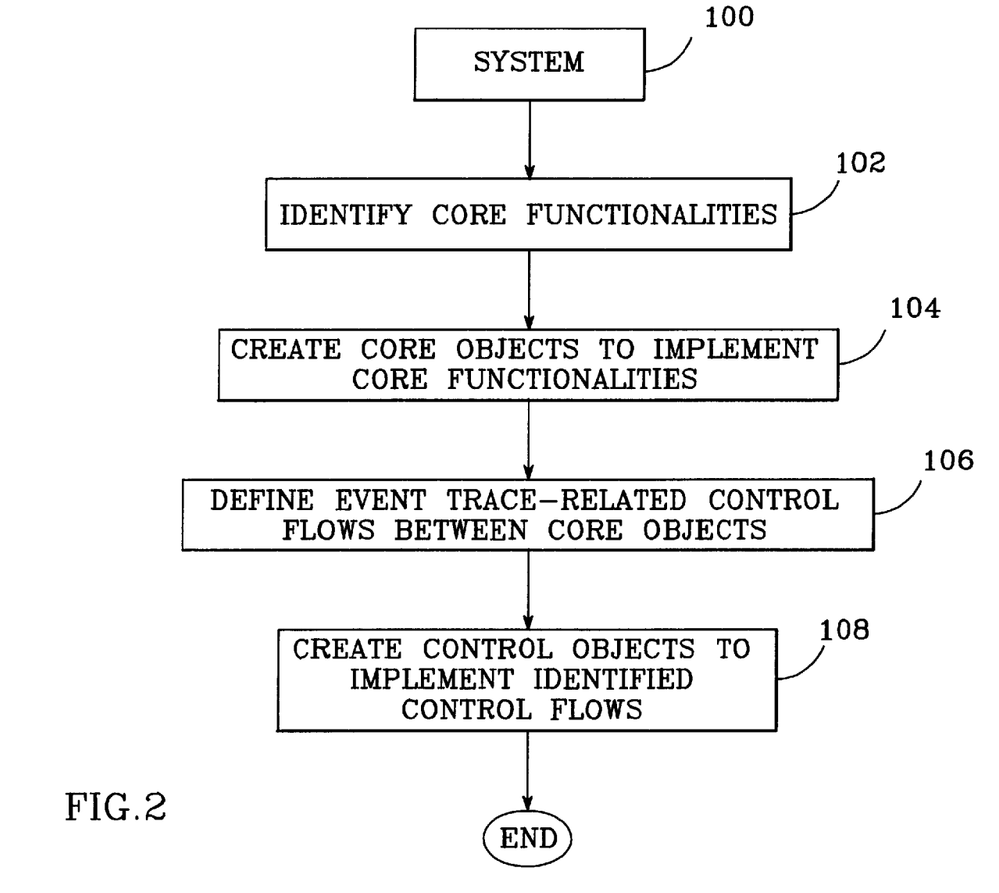
FIG. 2 is a flow chart illustrating the basic method of creating and re-using system-independent software components per the present invention.

A flow chart illustrating the novel method of creating and re-using system-independent software components is shown in FIG. 2. The process would typically begin with a particular system 100—an air traffic control system, for example—which is to be realized with a software program.

In step 102, the application is analyzed to determine its "core functionalities", i.e., the essential behavior required by the system. For the air traffic control system, core functionalities might include, for example, identifying and tracking aircraft, displaying radar information, and detecting possible collisions.

"Core objects" are then created (step 104) that implement the core functionalities. A core object may be a single object, or may be "decomposed" into a number of "sub-core" objects. These core and sub-core objects should have no system-specific control behavior embedded within them. Per conventional OOP principles, each core object represents a real-world entity (such as an airplane) which has an associated state (i.e., data that describes the entity, such as plane type, fuel capacity, etc.), identity, and behavior (e.g., takes-off, flies, lands).

System event traces in which the core objects might participate as the system is operated are defined next (step 106). These system-specific event-related control flows are then placed within a "control object" (step 108), which invokes the operations of the core objects as directed by the event traces embedded within the control object.

Note that the inventive method is not limited to the exact ordering of steps depicted in FIG. 2. For example, it may be advantageous to define a system's event traces (step 106) first, and use the information so developed to identify core functionalities (step 102). Similarly, it is possible to create the system's control objects (step 108) prior to the detailed development of its core objects (step 104).

Code for core, view manager (discussed in detail below), and control objects is written using OOP techniques. The resulting system therefore benefits from the advantages attributed to object-oriented methods, such as good reliability and high maintainability. Furthermore, because OOP provides a system architecture that is organized as a group of co-operating components that collaborate with each other to provide a system's capabilities, an OOP-based system inherently provides more re-usable code than an equivalent system developed using a classical functional approach. The inherent re-usability found in an OOP-based system is further enhanced by the invention's use of control objects as described herein.

The re-usable objects can be written using any object-oriented programming language, such as C++ or Ada-95. The core objects are preferably designed and created using object modeling methodology such as the OMT methodology described, for example, in J. Rumbaugh et al., *Object-Oriented Modeling and Design,* Prentice-Hall (1991), pp. 260–264, or with the Unified Modeling Language (UML) described in *UML Summary Version* 1.0.1, Rational Corporation (1997).

A system's event traces are defined using conventional means, starting with use case analysis and developing a system event response list. A system's event traces are established by performing an analysis of how the various segments interact with each other to achieve the functionalities described in the system level use cases. The creation of use cases is discussed, for example, in I. Jacobson et al., *Object-Oriented Software Engineering,* Addison-Wesley (1992), pp. 113–143. The creation of event traces is described, for example, in J. Rumbaugh et al., *Object-Oriented Modeling and Design,* Prentice-Hall (1991), pp. 86–87.

Figure 3:
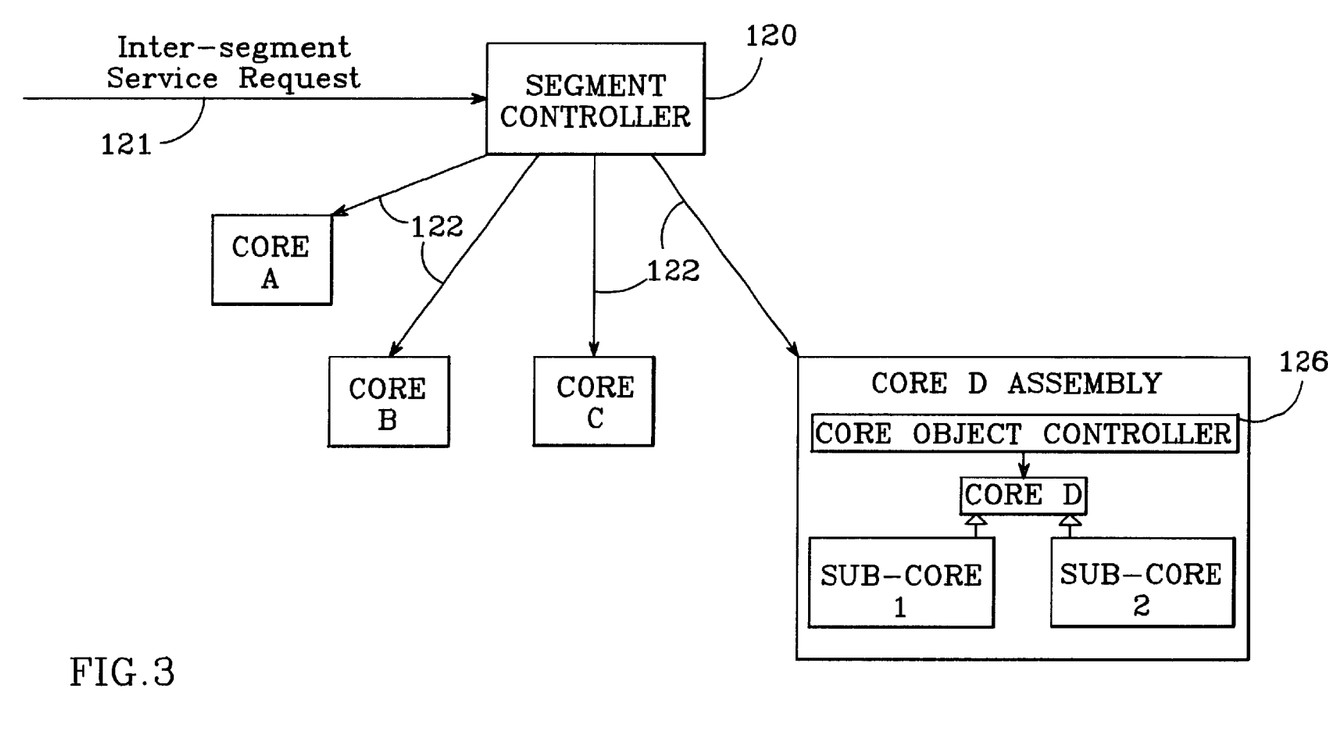
FIG. 3 is a diagram illustrating the use of control objects per the present invention.

An example of the relationship between a system's core and control objects resulting from the method described herein is shown in FIG. 3. Core objects CORE A, CORE B, CORE C and CORE D ASSEMBLY are created per step 104, each implementing a core function of a particular system. As noted above, each of the core objects can be a single object or an assembly of objects, with an assembly consisting of a "parent" core object and one or more sub-core objects. CORE D ASSEMBLY is such an assembly, with an object CORE D being the parent to sub-core objects SUB-CORE 1 and SUB-CORE 2.

In this example, core objects CORE A, CORE B, CORE C and CORE D ASSEMBLY form a "segment", i.e., a group of core objects that perform a particular higher-level function. For example, objects "Radar" and "Air Track" in FIG. 1a might be grouped as a segment, to handle the higher-level tracking function in an air traffic control system. The system event trace-related control flows for the segment are defined for core objects CORE A, CORE B, CORE C and CORE D ASSEMBLY per step 106, and are placed within a control object 120; because the core objects make up a segment, control object 120 is identified as a "segment controller". When the function performed by the segment needs to be carried out, segment controller 120 is invoked, typically via a service request 121 from another segment.

The arrows 122 in FIG. 3 reflect the control flow for core objects CORE A, CORE B, CORE C and CORE D ASSEMBLY as managed by segment controller 120. The segment controller 120 disseminates only control, not data; i.e., no data flows back to the controller 120 from the core objects.

The segment controller 120 is notified that a core object has completed its processing by means of a simple status message, and the controller 120 then invokes the next core object in the sequence in accordance with the event trace being executed.

Because the segment controller 120 embodies information about every event in which the segment's objects might participate and invokes its core objects accordingly, no control flow information need be embedded in the individual core objects. By removing the system-specific control behavior from the core objects in this way, the objects become readily reusable in other systems having different event traces. When a core object's core functionality is required in another system, it can typically be used either exactly as originally created or with minor modifications, with the control flows for the new system embodied in a new or modified segment controller. Because they simply execute event traces, the design of the segment controllers is simple. Therefore, the effort needed to modify the segment controller 120 for a new application can be expected to be small.

If a core object needs data from another object within its own segment, it gets it via a direct interaction with that object; i.e., the data does not go through the segment controller 120. For example, if CORE B needs data from CORE C, it interacts with CORE C directly to get the needed data. Such direct interactions are employed when the particular interaction is part of the fundamental behavior of the objects. Here, for example, CORE B needs data from CORE C to fulfill one of its basic responsibilities; therefore, it initiates the interaction directly.

As noted above, some core objects can be decomposed into a number of "sub-core" objects. This is illustrated in the block labeled CORE D ASSEMBLY in FIG. 3, which contains two sub-core objects SUB-CORE 1 and SUB-CORE 2. In OOP terminology, CORE D is referred to as the "parent" object of "child" objects SUB-CORE 1 and SUB-CORE 2. The inventive method described herein can be applied to CORE D ASSEMBLY in the same way that it was applied to the entire segment. That is, SUB-COPE 1 and SUB-CORE 2 are designed to implement certain specialized core functionalities of CORE D. Control flows involving invocation of SUB-CORE 1, SUB-CORE 2 or CORE D are placed into a controller 126, identified here as a "core object controller". All requests for invoking an operation within CORE D ASSEMBLY are received first by core object controller 126, which directs the request to the appropriate object within the assembly; i.e., CORE D, SUB-CORE 1 or SUB CORE 2. This is achieved using an OOP technique commonly known as polymorphism. Separating core functionalities and control behavior in this way allows the CORE D, SUB-CORE 1 and SUB-CORE 2 objects to be system-independent, and thereby re-usable in other systems by simply modifying the core object controller 126. Thus, the inventive method is applicable at both the higher, segment levels and lower, core levels of a system, with the number of re-usable software components increasing as the method is more widely applied.

Figure 4:
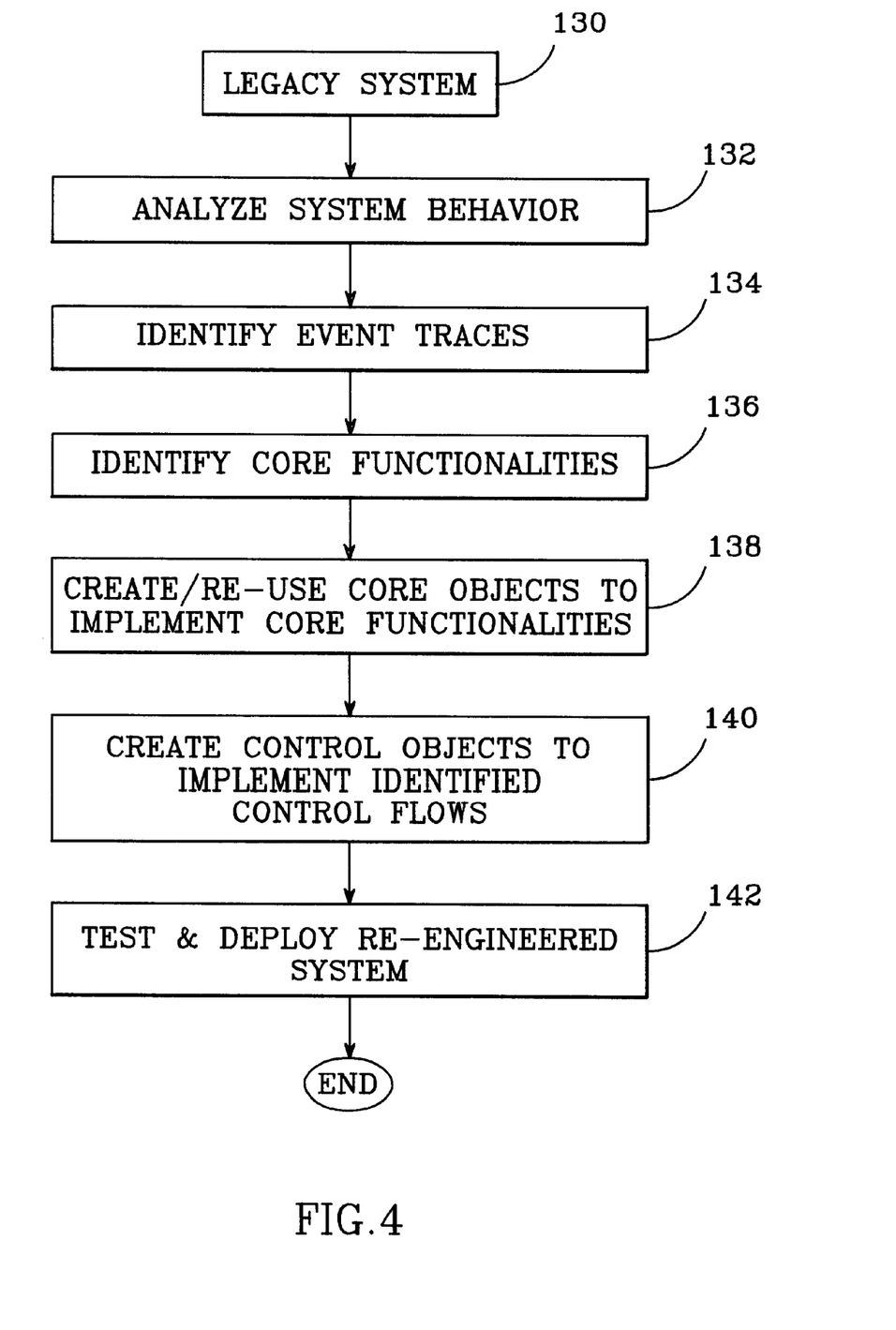
FIG. 4 is a flow chart illustrating a method of re-engineering a legacy system to produce a system which employs re-usable system-independent software components per the present invention.

The process is applicable to the creation of completely new software applications, as well as to the re-engineering of legacy systems to create new systems built with system-independent re-usable objects. The method is similar for both cases, though some additional analysis steps are required when re-engineering a legacy system. A diagram of the process for re-engineering a legacy system is shown in FIG. 4. The behavior of a legacy system 130 is analyzed (step 132), to identify the system's event traces (step 134) and its core functionalities (step 136). System-independent core objects are created (or re-used from other systems or an object repository) (step 138) to implement the core functionalities. Control objects are then created to implement the system's event traces (step 140), and the resultant new system is tested and deployed (step 142). The re-engineered system now contains system-independent core objects that are readily re-usable in other systems.

As noted above in connection with FIG. 2, it is not essential that the steps depicted in FIG. 4 be followed in the exact sequence shown. While each of the steps must be performed to practice the invention, a number of different orderings can be employed to successfully produce a re-engineered system.

Alternatively, re-usable core objects could be created abstractly and held in an object repository, without any particular system in mind. Basic functions that might be needed in a wide variety of systems, such as an object that performs basic air traffic control operations, can be created per the present invention, as long as no system-specific control behaviors are embedded within the resulting object. When the object is chosen for use in a system, the event traces that involve the object are determined as previously discussed, and a control object created to implement those traces.

The re-usability of core objects can be further enhanced with the use of "view managers", which provide a method of handling persistent interactions between "server" core objects and their respective "client" core objects. A view manager is an object or a set of objects which provide a mechanism for disseminating data from one "server" core object to one or more other core objects—referred to herein as "clients"—on an event notification basis. The clients may be objects within a particular segment, or they may be in different segments. A separate view manager is created for each core object. Similarly a separate "sub-view" manager is created for each sub-core object.

Figure 5:
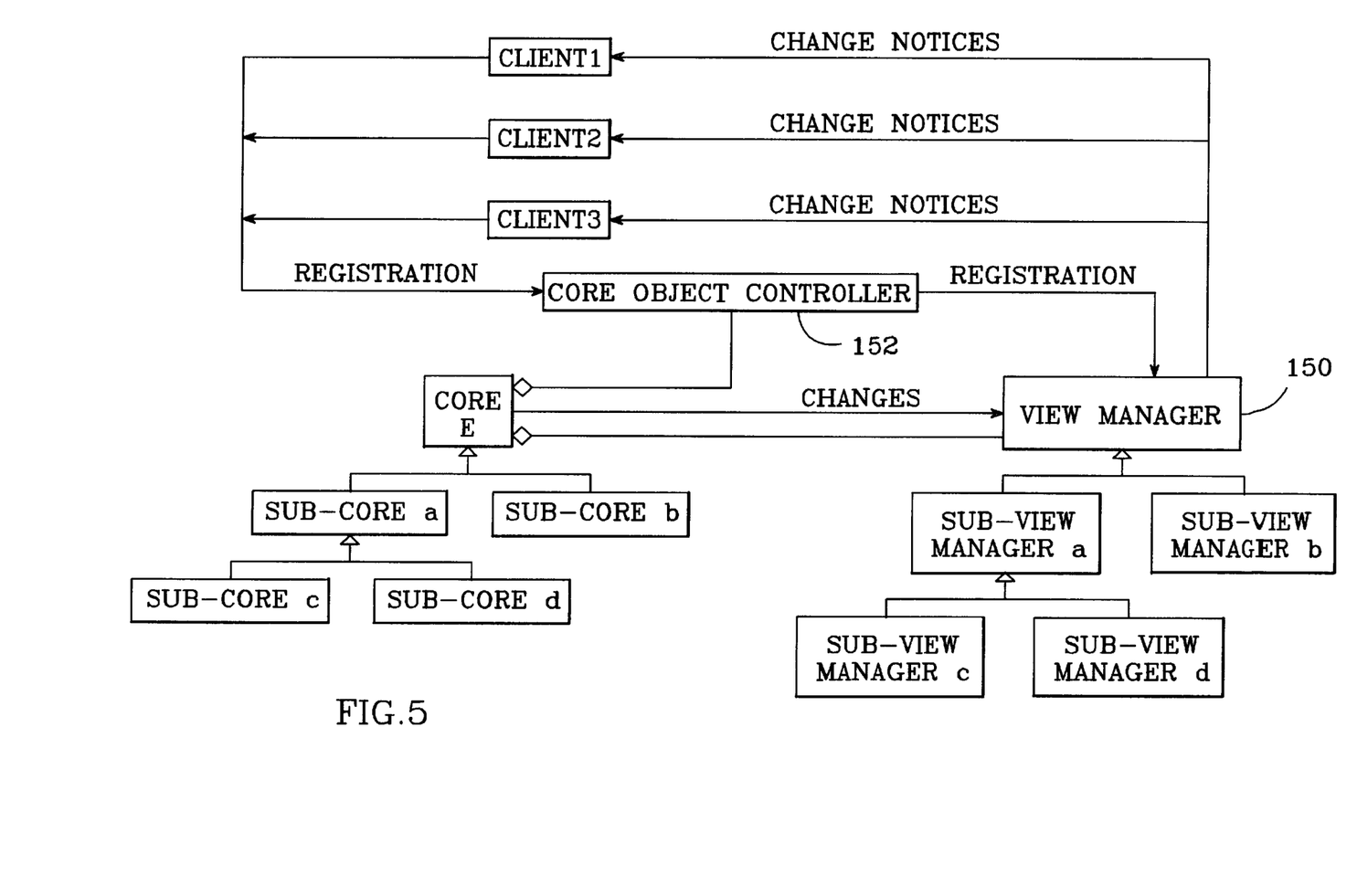
FIG. 5 is a diagram illustrating the use of a view manager object per the present invention.

An example of the use of view managers is illustrated in FIG. 5. A view manager 150 is located between a core object CORE E which includes sub-core objects a, b, c and d, and a core object controller 152. The view manager 150 can receive data from either the core object controller 152 or the CORE E object. The view manager 150 is decomposed into sub-view manager objects a, b, c and d, which are created to manage the dissemination of data from sub-core objects a, b, c and d, respectively. In this example, there are three "clients" (identified as CLIENT 1, CLIENT 2, and CLIENT 3), i.e., other segments or objects that require data found within the CORE E assembly.

A client object first "registers" with view manager 150 via the core object controller 152, thereby informing the view manager that the client wants to automatically receive change notices whenever there is a state change within CORE E or any of its sub-core objects a–d. If the registration indicates that the client is interested in changes in data managed by one of the sub-core objects, then the view manager 150 sends this registration information to the sub-view manager associated with the sub-core object that manages the data of interest to the client. When there is a state change in CORE E or sub-core objects a–d, its associated view manager broadcasts "change notices" to the registered clients to inform them of the changes; this is achieved using the OOP technique commonly known as polymorphism.

In the past, the communication of data from server objects to their client objects had to be embedded into the objects involved. Removing these data communication details from the core objects and placing them into the view managers enhances the re-usability of core objects. Note that as registration is dynamic, view managers typically do not need to be modified when reused. When core objects have been created using both the control object and view manager concepts described herein, the re-usability and the extensibility of the software are considerably enhanced.

Figure 6:
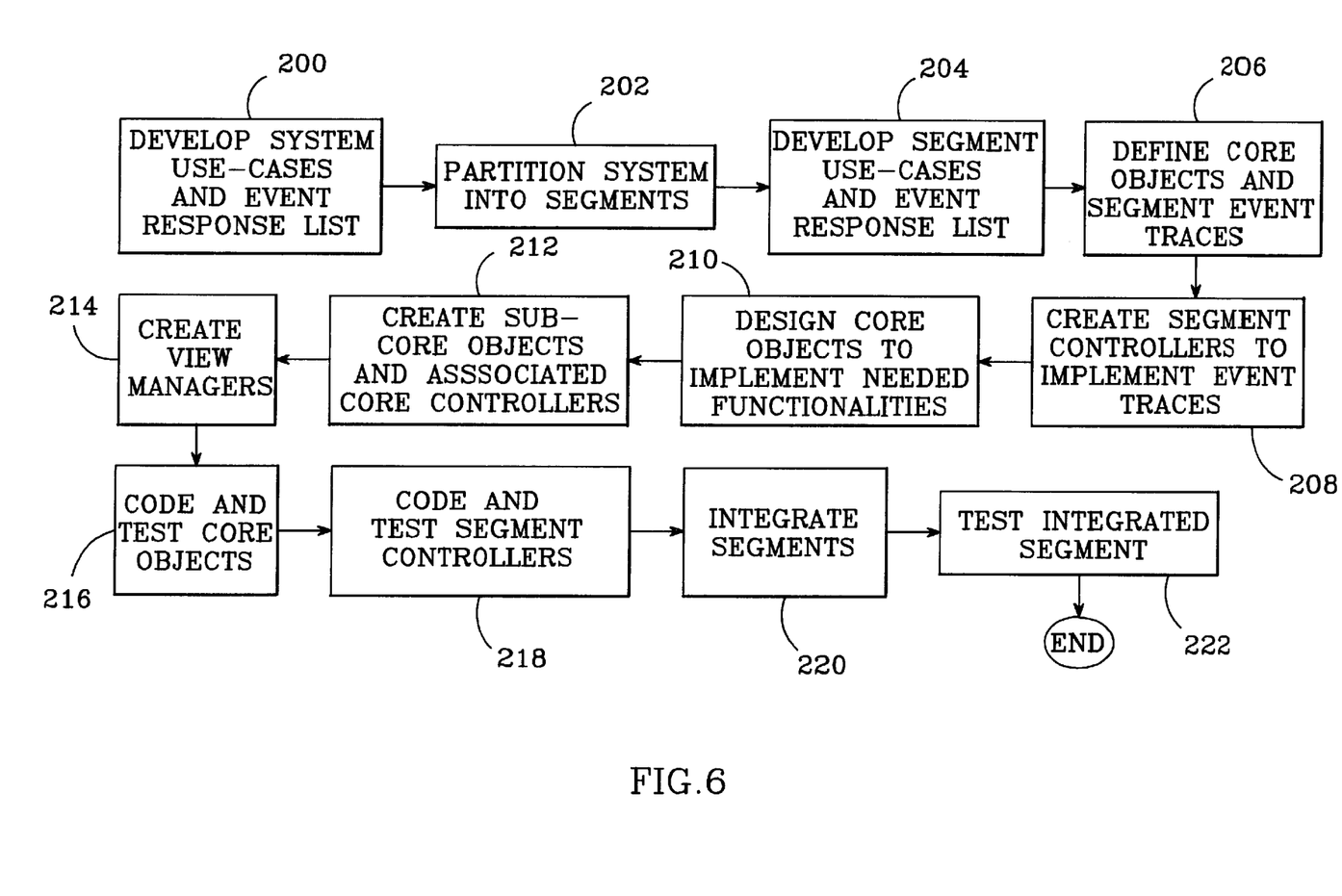
FIG. 6 is a flow chart illustrating a more detailed method of creating and re-using system-independent software components per the present invention.

A more detailed depiction of the inventive method as it might be used to develop a new software system is shown in FIG. 6. In step 200, system-level use-cases are developed, as is a system level event-response list. These steps help to define the functionalities needed by the system.

The identified functionalities are partitioned into developmental/operational segments (step 202). As noted above, a segment is a subset of the full system functionality, and should provide a cohesive stand-alone capability. The system architecture will consist of the segments and the interfaces between them.

Use-cases and event-response lists are developed at the segment level (step 204). For each functional event, the core objects needed to accomplish the function are described, and the responses to events are defined.

Core objects are defined, and segment event trace diagrams describing the interactions of the objects within each segment are developed based on the use-cases and event-response list (step 206). Each segment may have multiple event traces which describe multiple threads of functionality in the segment.

In step 208, segment controllers (described above) are defined based on the segment event traces developed, which should encapsulate the segments' behavior and external interface. The segment controllers' public operations (methods) are also defined, which will serve as the Application Program Interfaces (APIs) for their respective segments.

The detailed design of the core objects—including their public attributes and operations (methods)—is accomplished in step 210, based on the segment event traces defined in step 206.

In step 212, sub-core objects 2re defined as necessary, along with the core object controllers (described above) needed to manage the control tasks among the sub-core objects.

View managers (described above) are created in step 214, to handle persistent interactions between core objects and their clients.

In step 216, the core objects are coded, tested and archived, and the same is done for the segment controllers in step 218. The segments, core objects and view managers are integrated in step 220, and the integrated segments are tested and archived in 222.

At this point, a system has been created, and the core objects employed by the system are readily reusable in other systems, requiring only the segment controllers to be modified.

As noted above in connection with FIGS. 2 and 4, it is not essential that the steps depicted in FIG. 6 be followed in the precise order shown. A number of different orderings can be employed to successfully produce a functional system featuring re-usable software components.

While particular embodiments of the invention have been shown and described, numerous variations and alternate embodiments will occur to those skilled in the art. Accordingly, it is intended that the invention be limited only in terms of the appended claims.

We claim:

1. A method of creating system-independent software components, comprising the steps of:
    identifying core functionalities required by a software system;
    creating system-independent core objects which implement said core functionalities;
    defining event trace-related control flows between said core objects based on said software system; and
    creating control objects which invoke operation of said core objects in accordance with said event trace-related control flows;
    whereby separating said core functionalities and said event trace-related control flows into said core objects and said control objects, respectively, enables said core objects to be re-used in other software systems having different event trace-related control flows.

2. The method of claim 1, wherein said event trace-related control flows between said core objects are those which are required when operating said software system.

3. The method of claim 1, wherein each of said core objects are created with object-oriented programming (OOP) techniques.

4. The method of claim 1, wherein each of said control objects are created with object-oriented programming (OOP) techniques.

5. The method of claim 1, wherein said core objects and said control objects are written in an object-oriented programming language.

6. The method of claim 1, further comprising the step of identifying segments, each of which comprises a group of core objects that together perform a particular function, wherein one of said control objects is a segment controller which invokes the operation of the core objects of a particular segment in accordance with said event trace-related control flows, wherein separating said core functionalities and said event trace-related control flows into said segments and said segment controller, respectively, enables said segments to be re-used in other software applications by modifying said segment controller to accommodate different event traces.

7. The method of claim 6, wherein said core objects obtain data needed from other core objects within the same segment via direct interaction with said other core objects independent of said segment controller.

8. The method of claim 1, further comprising the step of creating view manager objects for each of said core objects, each of said view manager objects functioning as a communication interface for conveying data from its associated core object to one or more other core objects.

9. The method of claim 8, wherein each of said view manager objects are created with object-oriented programming (OOP) techniques.

10. The method of claim 8, wherein data is automatically conveyed from said associated core object to said other core objects when said associated core object undergoes a state change.

11. The method of claim 8, further comprising the steps of:
    decomposing a core object into a plurality of sub-core objects, said decomposed core object being a parent object to said plurality of sub-core objects;
    defining event trace-related control flows between said sub-core objects which are required when their parent object is invoked;
    creating a control object which invokes the operation of said sub-core objects in accordance with said defined event trace-related control flows, said control object being a core object controller, wherein said sub-core objects may be re-used in other software systems by modifying said core object controller to accommodate different event traces; and decomposing a view manager object into a plurality of sub-view manager objects, each of which functions as a communication interface for conveying data from a respective one of said sub-core objects.

12. The method of claim 1, further comprising the steps of:

decomposing a core object into a plurality of sub-core objects, said decomposed core object being a parent object to said plurality of sub-core objects;

defining event trace-related control flows between said sub-core objects which are required when their parent object is invoked; and creating a control object which invokes the operation of said sub-core objects in accordance with said defined event trace-related control flows, said control object being a core object controller, wherein said sub-core objects may be re-used in other software systems by modifying said core object controller to accommodate different event traces.

13. A method of re-engineering a legacy software system into a new software system which utilizes system-independent software components, comprising the steps of:

identifying system event traces required by said legacy software system;

identifying core functionalities of said legacy software system;

creating system-independent core objects which implement said core functionalities; and creating control objects which invoke operation of said core objects in accordance with said identified system event traces, said core objects and said control objects forming a new software system which utilizes system-independent software components, wherein separating said core functionalities and said event traces into said core objects and said control objects, respectively, enables said core objects to be re-used in other software systems having different event traces.

14. The method of claim 13, further comprising the step of analyzing the legacy software system's behavior to identify said system event traces and said core functionalities.

15. The method of claim 13, wherein each of said core objects and said control objects are created with object-oriented programming (OOP) techniques.

16. A method of creating system-independent software components and using them in a particular software system, comprising the steps of:

partitioning a particular software system's functionalities into respective segments;

developing use-cases and an event-response list for each of said segments;

defining system-independent core objects for each of said segments to implement their associated segment's functionalities;

defining event trace-related control flows for each segment which describe the interactions among the core objects within the segment;

creating a segment controller for each of said segments based on said event trace-related control flows, said segment controllers arranged to manage the control flows among the core objects within their associated segments; and creating respective view manager objects for each of said core objects, each of said view manager objects functioning as a communication interface for conveying data from its associated core object to one or more other core objects.

17. The method of claim 16, further comprising the steps of developing use-cases and an event-response list for said particular software system to determine its functionalities.

18. The method of claim 16, further comprising the step of defining public operations for each of said segment controllers, said public operations serving as application program interfaces (APIs) for their respective segments.

19. The method of claim 16, further comprising the step of defining public operations for each of said core objects.

20. The method of claim 16, further comprising the steps of decomposing a core object into an assembly of sub-core objects and creating core object controllers for each of said decomposed core objects, each of said core object controllers managing the control flows between its respective core object's sub-core objects.

21. The method of claim 20, further comprising the step of decomposing a view manager object into an assembly of sub-view manager objects, each of which functions as a communication interface for conveying data from a respective one of said sub-core objects.

22. The method of claim 16, further comprising the steps of coding, testing and archiving said core objects.

23. The method of claim 16, further comprising the steps of coding and testing said segment controllers.

24. The method of claim 16, further comprising the steps of integrating said core objects and said segment controllers into integrated segments, testing said integrated segments, and archiving said integrated segments.

* * * * *